United States Patent [19]
Yoshimatsu et al.

[11] Patent Number: 5,496,897
[45] Date of Patent: Mar. 5, 1996

[54] PROCESS FOR PREPARING UNIFORMLY SIZED, FINE PARTICLES OF POLYMER

[75] Inventors: Akira Yoshimatsu; Akihiro Kondo; Rikio Tsushima, all of Wakayama, Japan

[73] Assignee: Kao Corporation, Tokyo, Japan

[21] Appl. No.: 926,384

[22] Filed: Aug. 10, 1992

Related U.S. Application Data

[63] Continuation of Ser. No. 582,020, Sep. 13, 1990, abandoned, which is a continuation of Ser. No. 247,072, Sep. 21, 1988, abandoned.

[30] Foreign Application Priority Data

Sep. 22, 1987 [JP] Japan .................................. 62-238383

[51] Int. Cl.$^6$ ....................................................... C08F 4/00
[52] U.S. Cl. ............................................. 525/266; 525/257
[58] Field of Search ...................................... 525/266, 257

[56] References Cited

U.S. PATENT DOCUMENTS

| | | | |
|---|---|---|---|
| 4,085,169 | 4/1978 | Saito et al. | 525/262 |
| 4,245,070 | 1/1981 | Kemp | 526/75 |
| 4,333,969 | 6/1982 | Wright et al. | 427/222 |
| 4,459,378 | 7/1984 | Ugelstad | 524/460 |
| 4,530,956 | 7/1985 | Ugelstad et al. | 524/458 |
| 4,536,545 | 8/1985 | Olener et al. | 525/317 |
| 4,624,992 | 11/1986 | Milani et al. | 525/266 |
| 4,626,554 | 12/1986 | DiGiulio | 521/57 |

FOREIGN PATENT DOCUMENTS

| | | |
|---|---|---|
| 55132 | 12/1981 | European Pat. Off. . |
| 187505 | 12/1985 | European Pat. Off. . |
| 57-24369 | 5/1982 | Japan . |
| 61-283607 | 12/1986 | Japan . |

OTHER PUBLICATIONS

European Search Report.

*Primary Examiner*—John C. Bleutge
*Assistant Examiner*—Karen A. Dean
*Attorney, Agent, or Firm*—Birch, Stewart, Kolasch & Birch

[57] ABSTRACT

Uniformly sized, fine particles of a polymer are produced by:

(1) mixing (B) a nonionic-organic compound being liquid at room temperature, having a solubility in water at 25° C. of 0.01 wt. % or larger and being compatible with (A) an oil-soluble, ethylenically unsaturated monomer, with the monomer (A) in an amount of 0.5 to 300 wt. % based on the monomer (A), (2) then adding the mixture of (A) and (B) to an aqueous dispersion of (C) particles of a seed polymer so as to make the mixture of (A) and (B) absorb onto the paricles (C) and (3) polymerizing the mixture of (A), (B) and (C) in the presence of an oil-soluble initiator for the polymerization to obtain said uniformly sized, fine particles.

6 Claims, 1 Drawing Sheet

FIG. I
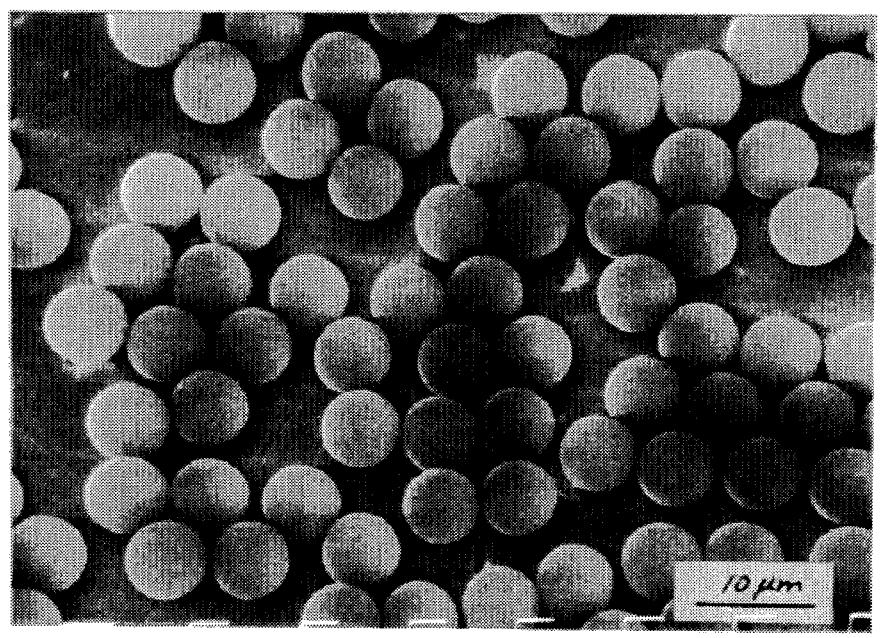
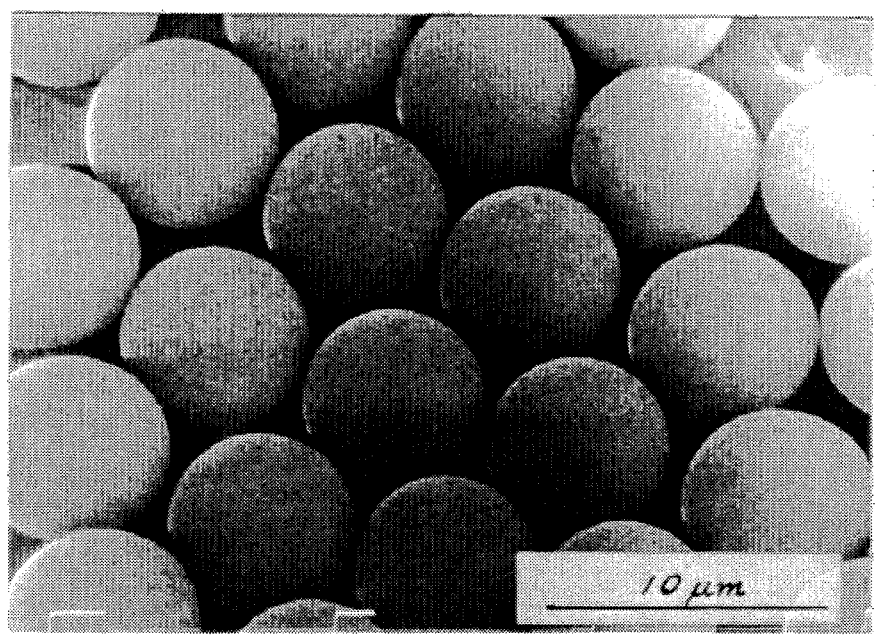
FIG. 2

PROCESS FOR PREPARING UNIFORMLY SIZED, FINE PARTICLES OF POLYMER

This application is a continuation, of application Ser. No. 07/582,020 filed on Sep. 13, 1990, now abandoned, the entire contents of which are incorporated herein by reference which is a continuation, of application Ser. No. 07/247,072 filed on Sep. 21, 1988, now abandoned.

FIELD OF INDUSTRIAL APPLICATION

The present invention relates to a process for preparing fine uniform-sized polymer particles by seed polymerization, and more specifically to a process for efficiently preparing non-porous or porous fine uniform-sized polymer particles having a size of 1 to 30 µm and excellent sphericity.

STATEMENT OF PRIOR ARTS

Polymer particles which are used as spacers, lubricants, packing material for chromatography, standard particles, diagnostic drugs, etc. are strongly required to have uniform particle size. Conventional methods of obtaining such particles often involve classification of particles prepared mainly by suspension polymerization according to a dry or wet process to obtain uniform particles. Although such classification makes polymer particles uniform to some extent to be recovered if no consideration is given to the yield thereof, however, the uniformity of the recovered particles is insufficient. A seed polymerization method, which comprises a vinyl monomer to be absorbed into fine monodisperse particles of a styrene polymer or the like and polymerizing the monomer to increase the sizes of the particles is known. In order to obtain particles having a size of 1 µm or larger, particularly around 10 µm, by this method, the procedure of absorption of a monomer into fine polymer particles and polymerization of the monomer must be repeated several times. This method, however, involves problems of reduction in the uniformity of the resulting particles and a decrease in the rate of polymerization. Besides this method, a method comprising two-step swelling seed polymerization to obtain uniform-sized polymer particles as represented by the process of Japanese Patent Publication No. 24,369/1982 is known. In this method, a water insoluble organic compound is preliminarily absorbed into seed particles to enhance the swelling capability thereof and the resultant particles are swollen with a vinyl monomer, followed by polymerization thereof. This method, however, has the disadvantage of low productivity because the hydrophobicity of the added compound in the first step is so high and the vinyl monomer is added in the form of oily droplets to a dispersion of the seed particles so that a prolonged swelling treatment is usually required in order to obtain swollen seed particles having a desired size.

SUMMARY OF THE INVENTION

As a result of intensive investigations with a view to overcoming the above-mentioned problems to develop a seed polymerization method aimed at efficiently obtaining a wide variety of fine uniform-sized polymer particles from a wide variety of monomer compositions according to a simple procedure, the inventors of the present invention have found that a fine emulsion prepared by adding a specific nonionic organic compound to an ethylenically unsaturated monomer and finely dispersing the resulting mixture in water is quickly absorbed into seed polymer particles. The present invention has been completed based on this finding.

Specifically, the present invention provides a process for preparing fine uniform-sized polymer particles comprising causing an oil-soluble ethylenically unsaturated monomer to be absorbed into seed polymer particles dispersed in an aqueous dispersion medium and polymerizing the monomer in the presence of an oil-soluble polymerization initiator, characterized in that an oil-soluble ethylenically unsaturated monomer (A) is admixed with 0.5 to 300 wt. %, based on the monomer (A), of a nonionic organic compound (B) being liquid at ordinary temperatures, having a water solubility at 25° C. of 0.01 wt. % or greater and being compatible with the monomer (A), the resulting mixture is caused to be absorbed into seed polymer particles (C) and the monomer (A) is polymerized therein.

The invention provides a process for preparing uniformly sized, fine particles of a polymer, which comprises the steps of:

(1) mixing (B) a nonionic organic compound being a liquid at room temperature, having a solubility in water at 25° C. of 0.01 wt. % or larger and being compatible with (A) an oil-soluble, ethylenically unsaturated monomer, with the monomer (A) in an amount of 0.5 to 300 wt. % based on the monomer (A), (2) then adding the mixture of (A) and (B) to an aqueous dispersion of (C) particles of a seed polymer so as to make the mixture of (A) and (B) absorb onto the paricles (C) and (3) polymerizing the mixture of (A), (B) and (C) in the presence of an oil-soluble initiator for the polymerization to obtain said uniformly sized, fine particles.

The process may comprise adding the nonionic organic compound (B) to the monomer (A) and dispersing the resulting mixture in an aqueous solution of a surfactant to obtain an emulsion thereof. It may comprise adding the nonionic organic compound (B) to the monomer (A) and dispersing the resulting mixture in an aqueous medium so as to obtain an emulsion having smaller particles of (A) and (B) than the seed polymer particles (C).

The invention further provides uniformly sized, fine particles of a polymer obtained by the process as defined above, preferably porous ones.

Any known seed polymer such as a styrene polymer, an acrylic polymer and the like used in conventional seed polymerization methods can be used as the seed polymer particles in the present invention. Those particles of a non-crosslinked type having an average particle size of 0.1 to 20 µm and a standard deviation in particle size distribution of 10% or less based on the average particle size are particularly preferred. When fine crosslinked particles are used, the sphericity of the resulting polymer particles according to the process of the present invention is often unfavorably reduced. Seed polymer particles can be obtained by repeating a conventional seed polymerization procedure using fine uniform-sized particles of about 0.04 to 0.2 µm in size prepared by soap-free polymerization or emulsion polymerization, or expediently by using a dispersion polymerization method in a non-aqueous system as disclosed in J. Polym. Sci., Polym. Lett. Ed, 23, 103 (1985). Needless to say, however, preparation of seed polymer particles is not limited to these methods.

Examples of the oil-soluble ethylenically unsaturated monomer to be used in the present invention include styrene compounds such as styrene, p-methylstyrene, and p-chlorostyrene; acrylate monomers such as ethyl acrylate, 2-ethylhexyl acrylate, lauryl acrylate, dimethylaminoethyl acrylate, and diethylaminoethyl acrylate; methacrylate monomers such as methyl methacrylate, ethyl methacrylate, lauryl methacrylate, dimethylaminoethyl methacrylate, and diethylaminoethyl methacrylate; polyethylene glycol mono (meth) acrylates; alkyl vinyl ethers such as methyl vinyl ether and ethyl vinyl ether; vinyl ester monomers such as vinyl acetate and vinyl butyrate; N-alkyl-substituted (meth) acrylamides such as N-methylacrylamide, N-ethylacrylamide, N-methylmethacrylamide, and N-ethylmethacrylamide; nitrile monomers such as acrylonitrile and methacrylonitrile; and polyfunctional monomers such as divinylbenzene, ethylene glycol diacrylate, ethylene glycol dimethacrylate, polyethylene glycol di(meth)acrylates, and trimethylolpropane triacrylate. Usable monomers are not limited to those mentioned above since oil solubility is the essential factor. These monomers may be used either alone or in mixture.

The nonionic organic compound to be used in the present invention is one which is liquid at ordinary temperatures, has a water solubility at 25° C. of 0.01 wt. % or higher, more preferably 0.1 wt. % or higher, and is compatible with the above-mentioned ethylenically unsaturated monomer. Examples of the nonionic organic compound include alcohols such as methyl alcohol, ethyl alcohol, isopropyl alcohol, isoamyl alcohol, and octyl alcohol; esters such as methyl acetate, ethyl acetate, butyl acetate, and isoamyl acetate; ketones such as acetone and methyl ethyl ketone; sulfoxides such as dimethyl sulfoxide and diethyl sulfoxide; amides such as dimethylformamide and dimethylacetamide; and nitriles such as acetonitrile and propionitrile, which are low-molecular-weight compounds having a molecular weight of 30 to 300.

Among the aforementioned ethylenically unsaturated monomers, those satisfying the above-mentioned requisites can be used as the nonionic organic compound. Such monomers include vinyl acetate, methyl methacrylate, acrylonitrile, and methacrylonitrile.

These nonionic organic compounds may be used either alone or in mixture.

After the ethylenically unsaturated monomer is admixed with 0.5 to 300 wt. %, preferably 2 to 200 wt. %, based on the monomer, of the nonionic organic compound, the resulting mixture is dispersed in an aqueous solution of a surfactant such as sodium lauryl sulfate with a homomixer or the like, or by an ultrasonic treatment or the like to give a stable emulsion containing fine droplets dispersed therein. When the amount of the nonionic organic compound to be added to the ethylenically unsaturated monomer is above the above-mentioned range, the water solubility of the monomer is increased unfavorably, resulting in trouble such as formation of new particles other than seed particles by polymerization or loss of the sphericity of particles after polymerization. On the other hand, when it is below the above-mentioned range, the migration rate of the monomer and the like into seed polymer particles is unfavorably low which provides poor absorption efficiency. The above-mentioned finely dispersed emulsion preferably contains finely dispersed droplets smaller than seed polymer particles since such droplets are more efficiently absorbed into the seed polymer particles.

According to the present invention, the above-mentioned finely dispersed emulsion is mixed with a dispersion of seed polymer particles to cause the seed polymer particles to absorb the mixture of the monomer with the nonionic organic compound and be swollen thereby, followed by polymerization. The absorption and swelling can usually be accomplished in a short time by mixing the emulsion of the monomer and the nonionic organic compound with the dispersion of the seed polymer particles and stirring the resulting mixture at room temperature for 1 to 6 hours. However, heating of the mixture to about 30 to 40° C. enables the absorption to occur more quickly. The degree of swelling can be arbitrarily chosen by controlling the mixing ratio of the monomer emulsion to the seed polymer particle dispersion. It is usually in a range of 5 to 150. A degree of swelling substantially falling within such a range is suitably adopted in the present invention. The degree of swelling mentioned herein is defined as a volume ratio of swollen particles to seed polymer particles before swelling thereof.

The completion of absorption can be easily confirmed by observation with an optical microscope or the like.

The monomer thus absorbed into the seed polymer particles is polymerized in the subsequent step, in which a common oil-soluble polymerization initiator can be used as the polymerization initiator. Usable polymerization initiators include peroxide initiators such as benzoyl peroxide, lauroyl peroxide, o-chlorobenzoyl peroxide, and o-methoxybenzoyl peroxide; and azo initiators such as 2,2'-azobisisobutyronitrile and 2,2'-azobis(2,4-dimethylvaleronitrile). The use of a water-soluble polymerization initiator unfavorably forms new polymer particles other than the seed particles.

The timing of addition of a polymerization initiator can be appropriately chosen between the step of mixing the monomer with the nonionic organic compound and the step of causing the finely dispersed emulsion to be absorbed into the seed polymer particles. However, mixing of the polymerization initiator together with the monomer and the nonionic organic compound to cause the initiator to be contained in the resulting fine disperse emulsion is most simple and hence preferable.

The polymerization temperature can be appropriately chosen depending on the kinds of polymerization initiator and monomer and is usually in a range of 25° to 100° C., more preferably 50° to 90° C. In the present invention, it is preferred that the monomer mixture be completely absorbed into the seed polymer particles before heating and polymerization. The polymerization may be initiated by starting elevation of the temperature in the latter stage of the absorption step. In this case, however, conditions must be chosen so as to avoid formation of new polymer particles other than the swollen particles described above.

In the polymerization step, any one of a variety of surfactants, polymeric protective colloids, etc. may be used in order to improve the dispersion stability of the polymer particles. Examples of such dispersion stabilizers include surfactants such as sodium lauryl sulfate, sodium laurylbenzenesulfonate, and sodium polyoxyethylene lauryl ether sulfate; water-soluble polymers such as gelatin, starch, hydroxyethylcellulose, carboxymethylcellulose, polyvinylpyrrolidone, polyvinyl alkyl ethers, and polyvinyl alcohol; and water-insoluble inorganic salts such as barium sulfate, calcium sulfate, barium carbonate, calcium carbonate, magnesium carbonate, and calcium phosphate.

The dispersion stabilizer may be added either after the absorption of the monomer mixture into the seed polymer particles or during the step of emulsification of the monomer mixture to achieve stabilization of the emulsion as well as to achieve dispersion at the time of polymerization.

Fine uniform-sized polymer particles can be obtained by the above-mentioned procedure of polymerization. The particle size may vary depending on the size of the seed polymer particles used and the ratio of the monomer to the seed polymer particles. The present invention is useful particularly in the case where fine uniform-sized polymer particles having a size of 1 to 30 µm and a standard deviation in particle size distribution of 10% or less based on the average particle size thereof is to be obtained. Fine polymer particles having a smooth homogeneous or uneven porous surface can be arbitrarily prepared if adequate conditions are chosen. Particularly, porous polymer particles can be obtained using the nonionic organic compound in a relatively large amount of usually 15 to 300 wt. % based on the monomer. This can be achieved more easily when a compound other than polymerizable unsaturated compounds is used as the nonionic organic compound. The lower limit of the above-mentioned amount of use may vary depending on the kind of nonionic organic compound. However, the conditions under which fine particles having a smooth surface are formed cannot clearly be distinguished from those under which fine porous particles are formed. Thus, polymer particles having a surface state adapted to the purpose can be obtained by suitably choosing the amount of the nonionic organic compound.

Fine polymer particles can be isolated after the polymerization as a powder according to a procedure comprising filtration to remove the aqueous phase, washing with water and/or a solvent, and drying by a customary method such as spray drying or drying under reduced pressure. The resulting powder comprises fine uniform-sized particles capable of being sufficiently and practically used even if it is not subjected to any particular classification treatment.

In the invention, a monomer, admixed with a selected nonionic organic compound and then emulsified, can be absorbed onto seed polymer particles in a short time even at room temperature, that subsequent polymerization of the above-mentioned monomer can give fine polymer particles which are uniform in size, and that even fine uniform-sized porous polymer particles can be obtained if adequate conditions are chosen.

The above shown feature is considered to be caused by a reduction in the surface tension between the aqueous phase and the monomer phase which has been attributed to the addition of the nonionic organic compound.

Specifically, the nonionic organic compound used in the present invention, when mixed with the monomer, acts to lower the interfacial surface energy between the oil droplets and the aqueous phase. For example, the interfacial tension between a liquid mixture of styrene (55%) with divinylbenzene (purity: 55%) (45%) and water was 7.52 dyne/cm (in a 0.12% aqueous SDS solution) and it lowered gradually, with an increasing amount of isoamyl acetate added thereto, to 2.94 dyne/cm when 100 wt. %, based on the above-mentioned liquid mixture, of isoamyl acetate was added thereto.

When the monomer emulsion is added to the seed polymer particles, the nonionic organic compound in the monomer oil droplets passes faster than the monomer molecules through the water phase to the seed polymer particles because it is more or less soluble in water. As a result, the interfacial surface energy between the remaining monomer oil droplets and water is increased to cause destabilization of the monomer oil droplets, which is believed to accelerate diffusion of the monomer from the fine monomer droplets to the seed polymer particles. Accordingly, the process of the present invention is a novel seed polymerization method utterly different in mechanism from the conventional seed polymerization methods and the two-step swelling seed polymerization methods involving increasing the swelling capability of a seed polymer and causing a monomer to be absorbed into the seed polymer particles, which are represented by the process of Japanese Patent Publication No. 24,369/1982.

The second feature that subsequent polymerization of the monomer can give fine polymer particles which are uniform in size is believed to be based on the same principle as that of the conventional seed polymerization methods that the use of uniform-sized seed polymer particles as a starting material provides a good uniformity in particle size of the product prepared by absorption of a monomer thereinto and subsequent polymerization of the monomer.

The third feature that fine porous particles can be obtained if adequate conditions are chosen is presumed to be according to a mechanism wherein the use of the nonionic organic compound which is compatible with the monomer but incompatible with a polymer formed therefrom allows the polymer to precipitate with the progress of polymerization of the monomer on the swollen particles to give a nonuniform structure of particles having an uneven surface.

Such a precipitation action is believed to depend on the amount of the nonionic organic compound used. In fact, when the above-mentioned compound was used in a relatively large amount of usually more than 15 wt. % based on the monomer, fine porous particles each having an uneven surface were obtained. In contrast, when the above-mentioned compound was used in a relatively small amount of usually 15 wt. % or less based on the monomer, fine spherical particles each having a less uneven or rather smooth surface were obtained.

As described above, the ethylenically unsaturated monomers satisfying the requisites of the present invention can be used as the nonionic organic compound. In this case, it is believed that the above-mentioned compound participates as a comonomer component in the polymerization reaction after the absorption thereof together with the monomer into the seed polymer particles. In fact, in such a case, fine spherical particles each having a less uneven or rather smooth surface are often formed irrespective of the amount of the above-mentioned compound used.

BRIEF DESCRIPTION OF DRAWING

FIGS. 1 and 2 are scanning electron microscope photographs showing the particle structure of fine polymer particles obtained in Examples 1 and 5, respectively.

EXAMPLES

Referential Example (Preparation of Seed Polymer Particles)

A solution of 7.2 parts of polyvinylpyrrolidone (molecular weight: 40,000) (the parts are by weight, the same will apply hereinbelow), 2 parts of Aerosol OT (anionic surfactant manufactured by Wako Pure Chemical Industries, Ltd.) and 0.5 part of azobisiso-butyronitrile in 340 parts of ethanol was heated to 70° C. under nitrogen gas with stirring, and then admixed with 50 parts of styrene. The resulting mixture was kept at the same temperature for 24 hours to give polymer particles having an average particle size of 1.83 µm and a standard deviation in particle size distribution of 2.5%.

Example 1

2.0 parts of dry particles obtained in Referential Example were admixed with 200 parts of ion-exchanged water and 0.13 part of sodium lauryl sulfate, and then uniformly dispersed therein. A solution of 5.0 parts of isoamyl acetate and 0.6 parts of benzoyl peroxide in 50 parts of a monomer mixture composed of 55% of styrene and 45% of divinylbenzene (purity: 55%) was mixed with 200 parts of ion-exchanged water and 0.3 parts of sodium lauryl sulfate, followed by an ultrasonic treatment. The resulting emulsion was added to the above-mentioned dispersion of the seed polymer particles, and the resulting mixture was stirred at 30° C. for 4 hours to completely absorb the monomers into the seed polymer particles. The resulting dispersion was admixed with 100 parts of a 3% aqueous solution of polyvinyl alcohol (GH-17 manufactured by Nippon Synthetic Chemical Industry Co., Ltd.; degree of saponification: 86.5 to 89 mol %). Polymerization was conducted, stirred, under nitrogen gas at 80° C. for 12 hours to obtain a dispersion of fine uniform-sized particles each having a smooth surface. The yield was 97%. The average particle size of the particles was 7.40 µm while the standard deviation in particle size distribution was 3.0%. The scanning electron microscope photograph of the polymer particles is shown in FIG. 1.

Example 2

Substantially the same procedure as that of Example 1 was repeated except that 5.0 parts of isoamyl alcohol was used instead of isoamyl acetate. The yield was 95%. The average particle size of the resulting particles was 7.5 µm while the standard deviation in particle size distribution was 3.2%.

Example 3

Substantially the same procedure as that of Example 1 was repeated except that 5.0 parts of methyl ethyl ketone was used instead of isoamyl acetate. The yield was 93%. The size of the resulting particles was 7.3 µm while the standard deviation in particle size distribution was 3.8%.

Example 4

2.0 parts of polystyrene seed particles having a size of 2.5 µm and a standard deviation in particle size distribution of 3.5% which were prepared according to substantially the same procedure as that of the above-mentioned Referential Example were admixed with 200 parts of ion-exchanged water and 0.14 parts of sodium lauryl sulfate, and then uniformly dispersed therein. Separately, a solution composed of 120 parts of methyl methacrylate, 6 parts of isoamyl acetate, and 0.6 part of lauroyl peroxide was mixed with 400 parts of ion-exchanged water and 0.8 parts of sodium lauryl sulfate, followed by an ultrasonic treatment. The resulting emulsion was admixed with the above-prepared dispersion of the seed polymer particles, and the resulting mixture was stirred at room temperature for 2 hours to completely absorb the monomer into the seed polymer particles. The resulting dispersion was stirred under nitrogen gas at 70° C. for 12 hours to effect polymerization to thereby obtain a dispersion of fine uniform-sized particles. The yield was 93%. The size of the resulting particles, was 9.8 µm while the standard deviation in particle size distribution was 4%.

Example 5

Polymerization was conducted according to substantially the same procedure as that of Example 1 except that 50 parts of isoamyl acetate was used instead of 5.0 parts of isoamyl acetate to obtain a dispersion of fine particles. The yield was 94%. The average particle size was 7.3 µm while the standard deviation in particle size distribution was 3.0%. The scanning electron microscope photograph of the polymer particles is shown in FIG. 2, which shows fine uniform-sized particles each having a porous surface.

Example 6

Substantially the same procedure as that of Example 5 was repeated except that 12.5 parts of isoamyl acetate and 37.5 parts of isoamyl alcohol were used instead of 50 parts of isoamyl acetate. The yield was 95%. The size of the resulting particles was 7.4 µm while the standard deviation in particle size distribution was 4.2%. They were fine porous particles.

Example 7

Substantially the same procedure as that of Example 5 was repeated except that 50 parts of methyl ethyl ketone was used instead of 50 parts of isoamyl acetate. The yield was 89%. The size of the resulting particles was 7.6 µm while the standard deviation in particle size distribution was 3.6%. The porousness was good.

Example 8

The same dispersion of polystyrene seed particles as that of Example 4 was prepared. Separately, a solution composed of 100 parts of methyl methacrylate, 20 parts of ethylene glycol dimethacrylate, 20 parts of isoamyl acetate, and 0.6 part of lauroyl peroxide was mixed with 400 parts of ion-exchanged water and 0.8 parts of sodium lauryl sulfate, and the resulting mixture was treated with a homomixer (at 13,000 rpm for 10 minutes) to obtain an emulsion.

The emulsion was added to the above-mentioned dispersion of the seed polymer particles, and the resulting mixture was stirred at room temperature for 2 hours to completely absorb the monomers into the seed polymer particles. The resulting dispersion was stirred under nitrogen gas at 70° C. for 12 hours to effect polymerization to thereby obtain a dispersion of fine uniform-sized particles. The yield was 90%. The size of the particles was 9.85 µm while the standard deviation in particle size distribution was 3.8%. Some particles were observed with a scanning electron microscope to reveal that the surfaces thereof were uneven.

Example 9

2.0 parts of seed particles obtained in the above-mentioned Referential Example were admixed with 200 parts of ion-exchanged water and 0.13 parts of sodium lauryl sulfate, and then dispersed therein. A solution of 17.5 parts of isoamyl acetate and 1.5 parts of azobisisobutyronitril in 50 parts of a monomer mixture composed of 75% of acrylonitrile and 25% of divinylbenzene (purity: 55%) was mixed with 320 parts of ion-exchanged water and 0.3 part of sodium lauryl sulfate, and the resulting mixture was subjected to an ultrasonic treatment to obtain an emulsion. The emulsion was added to the above-mentioned dispersion of the seed polymer particles, and the resulting mixture was stirred at 35° C. for 3 hours to completely absorb the monomers into the seed polymer particles. The resulting dispersion was admixed with 1.2 parts of sodium lauryl sulfate and 150 parts of water, and the resulting mixture was stirred under nitrogen gas at 65° C. for 12 hours to effect polymerization to thereby obtain a dispersion of fine uniformly sized porous particles. The size of the particle was 6.4 µm while the standard deviation in particle size distribution was 5.4%.

COMPARATIVE EXAMPLE

Substantially the same procedure as that of Example 1 was repeated except that a monomer emulsion was prepared without addition of isoamyl acetate to a monomer mixture. The monomer emulsion was added to a dispersion of a seed polymer and the resulting mixture was stirred for 4 hours, resulting in separation of the monomers as an oil phase. Polymerization was conducted while leaving the state intact to give polydisperse particles having a size ranging from 1 to 30 μm.

We claim:

1. A process for preparing uniformly sized particles of a polymer, which comprises the steps of:
   (1) mixing (A) an oil-soluble, ethylenically unsaturated monomer with (B) a nonionic non-polymerizable organic compound in an amount of 0.5 to 300 wt. % based on said monomer (A) to form a mixture of (A) and (B); said nonionic non-polymerizable organic compound (B) being a liquid at room temperature, being compatible with monomer (A), having a solubility of 0.01 wt. % or greater at 25° C. in water and being more soluble in water than monomer (A);
   (2) dispersing said mixture (A) and (B) in water to form a stable, finely dispersed aqueous emulsion of particles of mixture (A) and (B);
   (3) adding said stable finely dispersed emulsion to an aqueous dispersion of (C) particles of a seed polymer, so as to allow said mixture to absorb onto said particles (C), said seed polymer particles have an average particle size of 0.1 to 20 microns and a standard deviation in particle size distribution of 10 percent or less; and
   (4) polymerizing (A) in the presence of (B) and (C) and an oil-soluble initiator to obtain said uniformly sized, polymer particles.

2. The process as claimed in claim 1, which comprises adding said nonionic organic compound (B) to said monomer (A) to form a mixture of (A) and (B) and dispersing said mixture in an aqueous solution of a surfactant to obtain an emulsion thereof.

3. The process as claimed in claim 1, which comprises adding said nonionic organic compound (B) to said monomer (A) to form a mixture of (A) and (B) and dispersing said mixture in an aqueous medium so as to obtain said emulsion wherein particles of (A) and (B) are smaller than said seed polymer particles (C).

4. The process as claimed in claim 1 wherein said nonionic organic compound (B) has a solubility of 0.1 wt. % or greater at 25° C. in water.

5. The process as claimed in claim 1, wherein said uniformly sized particles are porous.

6. A process for preparing uniformly sized particles of a polymer, which comprises the steps of:
   (1) mixing (A) an oil-soluble, ethylenically unsaturated monomer with (B) a nonionic organic alcohol selected from the group consisting of methyl alcohol, ethyl alcohol, isopropyl alcohol, isoamyl alcohol, and octyl alcohol in an amount of 0.5 to 300 wt. % based on said monomer (A) to form a mixture of (A) and (B); said nonionic organic alcohol (B) being a liquid at room temperature, being compatible with monomer (A), having a solubility of 0.01 wt. % or greater at 25° C. in water and being more soluble in water than monomer (A);
   (2) dispersing said mixture (A) and (B) in water to form a stable, finely dispersed aqueous emulsion of particles of mixture (A) and (B);
   (3) adding said stable finely dispersed emulsion to an aqueous dispersion of (C) particles of a seed polymer, so as to allow said mixture to absorb onto said particles (C), said seed polymer particles have an average particle size of 0.1 to 20 microns and a standard deviation in particle size distribution of 10 percent or less; and
   (4) polymerizing (A) in the presence of (B) and (C) and an oil-soluble initiator to obtain said uniformly sized, polymer-particles.

* * * * *